(12) United States Patent
Doble

(10) Patent No.: US 7,174,191 B2
(45) Date of Patent: Feb. 6, 2007

(54) PROCESSING OF TELEPHONE NUMBERS IN AUDIO STREAMS

(75) Inventor: James T. Doble, Cary, NC (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/238,559

(22) Filed: Sep. 10, 2002

(65) Prior Publication Data

US 2004/0048636 A1  Mar. 11, 2004

(51) Int. Cl.
H04B 1/38 (2006.01)

(52) U.S. Cl. .................. 455/563; 455/564; 455/414.4; 455/566

(58) Field of Classification Search ................ 455/563, 455/466, 566, 567, 550, 574, 572, 414.4, 455/564; 379/88, 67.1, 88.04, 88.01, 88.13, 379/71
See application file for complete search history.

(56) References Cited

U.S. PATENT DOCUMENTS

| | | | | |
|---|---|---|---|---|
| 4,959,850 A * | 9/1990 | Marui | ................ | 455/563 |
| 5,504,805 A * | 4/1996 | Lee | ................ | 379/88.03 |
| 5,577,162 A * | 11/1996 | Yamazaki | ................ | 704/232 |
| 5,651,056 A * | 7/1997 | Eting et al. | ................ | 379/88.01 |
| 5,719,921 A * | 2/1998 | Vysotsky et al. | ................ | 379/88.01 |
| 5,909,662 A * | 6/1999 | Yamazaki et al. | ................ | 704/221 |
| 6,178,338 B1 * | 1/2001 | Yamagishi et al. | ................ | 455/566 |
| 6,396,906 B1 * | 5/2002 | Kaplan | ................ | 379/67.1 |
| 6,405,060 B1 * | 6/2002 | Schroeder et al. | ................ | 455/566 |
| 6,408,176 B1 * | 6/2002 | Urs | ................ | 455/413 |
| 6,529,586 B1 * | 3/2003 | Elvins et al. | ................ | 379/88.13 |
| 6,567,506 B1 * | 5/2003 | Kermani | ................ | 379/88.01 |
| 6,570,964 B1 * | 5/2003 | Murveit et al. | ................ | 379/67.1 |
| 6,580,917 B1 * | 6/2003 | Lefevre et al. | ................ | 455/466 |
| 6,735,457 B1 * | 5/2004 | Link et al. | ................ | 455/575.1 |
| 2002/0010008 A1 * | 1/2002 | Bork et al. | ................ | 455/567 |
| 2002/0076009 A1 * | 6/2002 | Denenberg et al. | ................ | 379/88.03 |
| 2002/0150092 A1 * | 10/2002 | Bontempi et al. | ................ | 370/389 |
| 2002/0196914 A1 * | 12/2002 | Ruckart | ................ | 379/88.21 |
| 2003/0078081 A1 * | 4/2003 | Schmier | ................ | 455/567 |
| 2003/0088421 A1 * | 5/2003 | Maes et al. | ................ | 704/270.1 |
| 2003/0103607 A1 * | 6/2003 | Feakes | ................ | 379/88.17 |
| 2003/0158728 A1 * | 8/2003 | Bi et al. | ................ | 704/207 |
| 2005/0177368 A1 * | 8/2005 | Odinak | ................ | 704/246 |

* cited by examiner

*Primary Examiner*—Matthew Anderson
*Assistant Examiner*—Tan Trinh
(74) *Attorney, Agent, or Firm*—Vedder, Price, Kaufman & Kammholz, P.C.

(57) ABSTRACT

Occurrences of at least one of a plurality of telephone number-related speech patterns are identified in an audio stream using speech analysis techniques. At least one number pattern corresponding to the occurrences are thereafter identified and stored for later presentation to a user of a mobile device. The occurrences and corresponding number pattern(s) may be filtered to reduce the likelihood of false detections. Furthermore, the detected number pattern(s) may be augmented to ensure completeness. Users may edit and persistently store the resulting number pattern(s). In one embodiment, a portion of the audio stream may be stored and subsequently subjected to the speech analysis process. The stored portion of the audio stream may be reproduced at substantially the same time that at least one number pattern detected therein is provided to the user. In this manner, telephone numbers in audio streams may be captured safely and conveniently.

21 Claims, 3 Drawing Sheets

PROCESSING OF TELEPHONE NUMBERS IN AUDIO STREAMS

TECHNICAL FIELD

The present invention relates generally to wireless communication systems and, in particular, to a technique for processing occurrences of telephone numbers in audio streams.

BACKGROUND OF THE INVENTION

Wireless communication systems are well known in the art. In such systems, communications are typically supported by a wireless infrastructure that wirelessly communicates with one or more wireless communication devices (or mobile devices), such as cellular phones or portable radios. Furthermore, suitable connections between the wireless infrastructure and other networks, such as the so-called plain old telephone system (POTS) or the Internet, allow users of mobile devices to communicate with other parties not equipped with similar mobile devices. In general, such wireless systems provide a convenient means for users thereof to communicate with others despite being on the move.

The portability of such mobile devices, while a great advantage in some respects, has given rise to previously unseen difficulties. For instance, when in a mobile environment (e.g., away from an office or home), users often lack the ability to record information conveyed during voice communications. This situation often arises where a receiving user is listening to audio signals provided directly by another user (as in the case of a typical voice conversation) or from a storage mechanism (e.g., a voice mail system or answering machine), and a telephone number needed by the receiving user occurs within the audio stream. Unless the receiving user happens to have some means of quickly recording the telephone number for later use (e.g., a pen and paper) at hand, the receiving user often has to attempt to memorize the telephone number very quickly. In the case of recorded audio, the user may be able to go back and listen to the telephone number more than once in an effort to memorize it, although this may represent an inconvenience to the user. Additionally, such multiple playbacks represent an added expense to the user in terms of air time charges. Note that the opportunity to replay audio is not an option during a typical live, voice communication. Furthermore, even if the user does have some means at hand for transcribing the telephone number, the nature of many mobile environments makes it prohibitive for the receiving user to be distracted from his/her current activity (e.g., driving a car, walking along a crowded street, etc.) to record the telephone number or divert sufficient attention to memorize the number.

Therefore, it would be advantageous to provide a technique for mobile devices to detect and process telephone numbers occurring in audio streams in order to capture such telephone numbers for later use. Such a technique should preferably operate in an automatic manner or with minimal user input, while still allowing for user intervention to ensure accuracy of captured telephone numbers.

DETAILED DESCRIPTION OF THE PREFERRED EMBODIMENTS

The present invention provides a technique for processing telephone numbers that occur within audio streams at a communication device. In particular, occurrences of at least one of a plurality of telephone number-related speech patterns are identified in an audio stream using speech analysis techniques. In a preferred embodiment, the audio stream includes a received audio stream, although the present invention could be used on audio streams being transmitted by the communication device. One or more number patterns corresponding to the occurrences of the at least one of the plurality of telephone number-related speech patterns are thereafter identified and stored for later presentation to a user of the communication device. In a preferred embodiment, the occurrences and corresponding one or more number patterns are filtered to reduce the likelihood of falsely detecting telephone numbers in the audio stream. Furthermore, the detected number pattern(s) may be augmented or transformed according to at least one user-defined rule. The resulting number pattern(s) detected (and filtered/augmented) in this manner may be presented to the user, thereby allowing the user to further edit the number patterns. By storing the number pattern(s) in persistent memory, such as a user-defined telephone directory, telephone numbers captured in this manner may be recalled any number of times. Furthermore, the audio stream may be continuously stored such that a recently received portion of the audio steam is available for analysis or playback in response to an instruction received from the user. When one or more number patterns are detected in the portion of the audio stream, the portion may be reproduced (i.e., rendered audible) at substantially the same time that the one or more number patterns are provided to the user, thereby allowing the user to verify the accuracy of the captured telephone number. In this manner, the present invention provides a mechanism for conveniently, and safely, capturing telephone numbers in audio streams.

Figure 1:
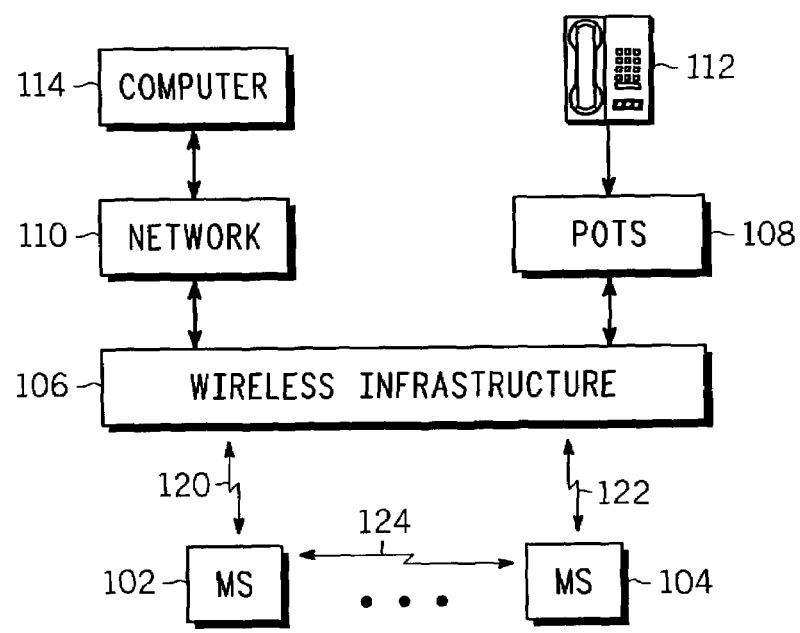
FIG. 1 is a block diagram of a wireless communication system in accordance with an embodiment of the present invention.

These and other advantages of the present invention are more fully described with further reference to FIGS. 1–4 below. Referring now to FIG. 1, a block diagram of a wireless communication system 100 is illustrated. In particular, the system 100 includes a plurality of wireless communication devices (or mobile devices) 102–104 in wireless communication with a wireless infrastructure 106 via one or more wireless channels 120–122. The mobile devices 102–104, illustrated in greater detail below with reference to FIG. 2, may include any wireless communication devices at least capable of receiving audio streams such as cellular phones, two-way radios, wirelessly-enabled personal digital assistants, etc. Although the present invention is primarily applicable to mobile devices, in may be beneficially applied to any type of communication device, including non-mobile devices such as traditional, landline telephones and the like. The wireless infrastructure 106 includes those elements necessary to support such wireless communications, as known in the art, the particulars of which elements will vary according to the type of system 100 employed. Such elements typically include base stations, resource controllers, transcoders, switches, and a variety of other elements known to those having ordinary skill in the art. The wireless channels 120–122 are likewise dependent upon the nature of the system 100 implemented. In general, however, the wireless channels 120–122 may include any wireless resources such as radio frequency (RF) channels, infrared channels, etc. supporting any suitable modulation protocol (e.g., frequency modulation, amplitude modulation, etc.) and/or access protocol, such as frequency-division multiplexed (FDM), time-division multiplexed (TDM) or code-division multiplexed (CDM) protocols. Note that additional wireless channels 124, of the type described above, may be provided in support of mobile-to-mobile communications such that the mobile devices 102–104 may communicate with each other without intervention of the wireless infrastructure.

As shown in FIG. 1, the wireless infrastructure 106 may support connections to other communication networks 108–110 such that other types of communication devices 112–114 may communicate with the mobile devices 102–104. For example, as known in the art, the wireless infrastructure 106 may support connections to the so-called plain old telephone system (POTS) 108 such that traditional landline telephone handsets 112 may communicate with the mobile devices 102–104. Alternatively, or in addition, the wireless infrastructure 106 may support connections with a computer network 110 (e.g., the Internet, World Wide Web, private networks, combinations thereof, etc.) such that computer-based platforms 114 (e.g., personal computers, laptop computers, handheld computers, etc.) may also communicate with the mobile devices 102–104. Techniques for enabling such computer-based communications with mobile devices are well known in the art. It is further understood that additional networks not illustrated in FIG. 1 could be coupled to the wireless infrastructure 106 in addition, or as alternatives, to the illustrated networks 108–110 as a matter of design choice.

Figure 2:
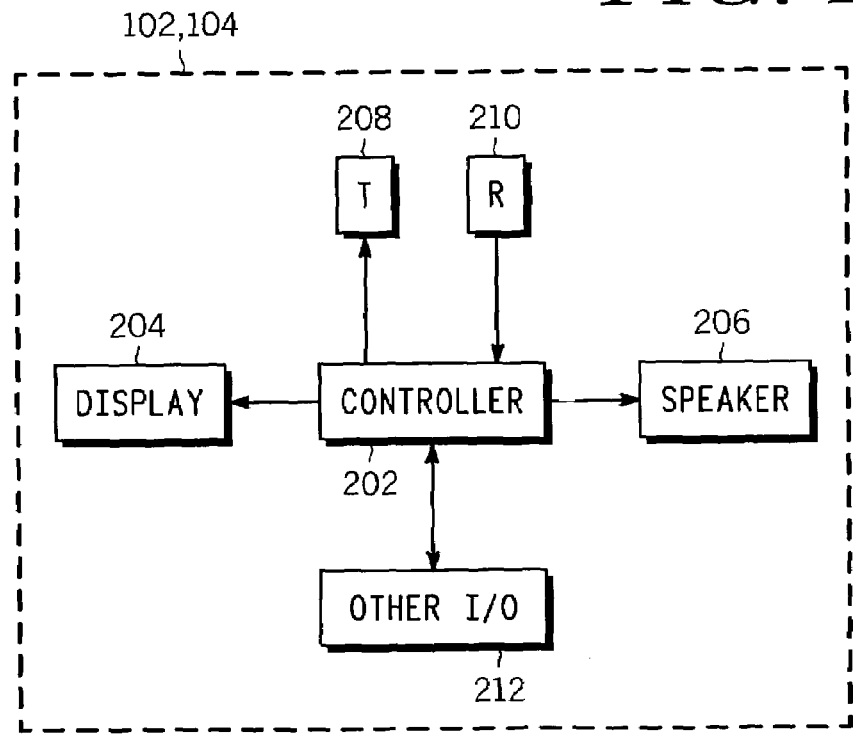
FIG. 2 is a block diagram of a wireless communication device in accordance with an embodiment of the present invention.

A mobile device 102–104 in accordance with the present invention is further illustrated with reference to FIG. 2. In particular, such mobile devices include a controller 202 coupled to a suitable display device 204, speaker 206, transmitter 208, receiver 210 and other input/output devices 212. The controller 202 may include any device or combination of devices capable of operating upon input data and signals and providing, as necessary, output data and signals. Various designs for such controllers are well known in the art. In a preferred embodiment, the controller 202 includes a device capable of maintaining state information, such as a microprocessor, microcontroller, digital signal processor, co-processor, programmable logic, application-specific integrated circuit, etc. or combinations thereof. In some instances, the controller may include one or more storage devices, such as volatile (e.g., random access memory) or non-volatile (e.g., electrically-erasable programmable read-only memory) memory suitable for non-persistent or persistent storage of data or executable instructions. The various techniques described below are preferably implemented as software code segments implemented as executable instructions. As used herein, such code segments may include any grouping (i.e., contiguous or non-contiguous) of one or more executable instructions for carrying out specific operation. Such code segments may be stored in a single storage device or may be distributed among several storage devices as a matter of design choice. Although specific operations described below may be attributed to a single such code segment, those having ordinary skill in the art will appreciate that specific operations could be distributed in a variety of different ways among several code segments without loss in functionality.

The display 204 may include any suitable mechanism for rendering data visible to a user of the mobile device, such as a liquid crystal display (LCD). The speaker 206 may include any suitable mechanism for rendering audio signals audible to a user of the mobile device. Other devices in support of the display 204 (e.g., graphics co-processors) and speaker 206 (e.g., digital-to-analog converter), although not illustrated, may be incorporated into the mobile device as a matter of design choice. The transmitter 208 may include any suitable wireless modulation/amplification device as known in the art. Likewise, the receiver 210 may include any suitable wireless demodulation/discrimination device as known in the art. In practice, the particular configuration and operation of the transmitter 208 and receiver 210 will depend upon the configuration of the wireless channel and communication protocols supported by the system 100.

Finally, the other input/output devices 212 include all other mechanisms by which signals are provided to/from the controller 202. For example, the mobile device may include a microphone, touch-screen, alphanumeric keypad, various buttons, soft keys, switches, dials or other user-actuable devices as known in the art. Further still, a data port may be provided such that various types of information, including audio streams, may be input directly to the controller 202. Likewise, various other types of output devices may be employed, such as light emitting diodes (LEDs), annunciators, vibrators and the like. The nature and extent of the other input/output devices 212 is a matter of design choice, and the present invention need not be limited in this regard. In one embodiment of the present invention, the other input/output devices 212 include mechanisms for a user to provide instructions to the controller to capture portions of an audio streams, request display of number patterns, request playback of stored portions of audio streams and to supply edits to displayed number patterns.

Figure 3:
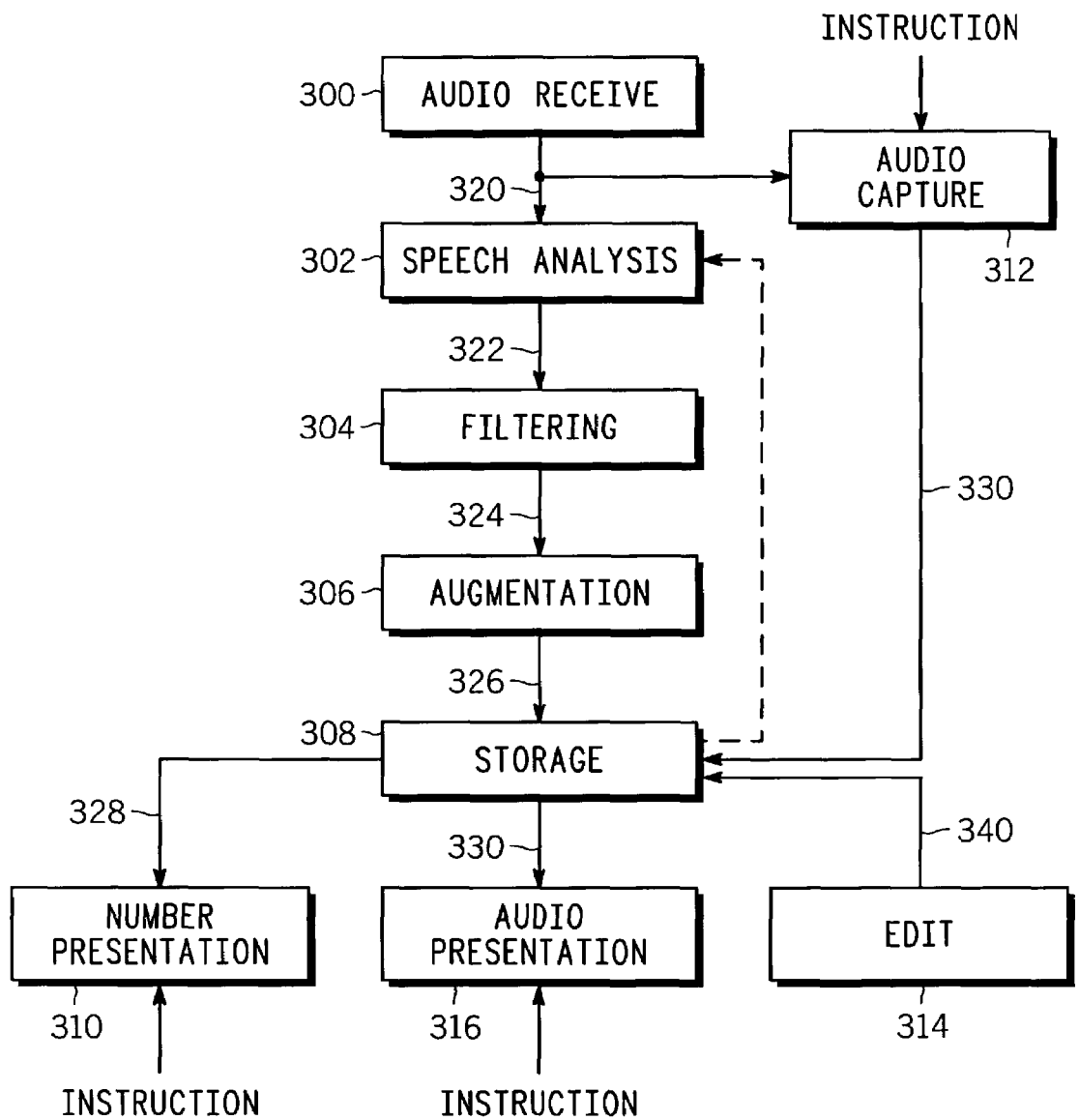
FIG. 3 is a data flow diagram of a technique for processing telephone numbers within audio streams in accordance with an embodiment of the present invention.

Referring now to FIG. 3, a data flow diagram in accordance with an embodiment of the present invention is provided. Each of the functional blocks 300–312 illustrated in FIG. 3 is preferably implemented as a code segment as described above using conventional programming techniques. As shown, an audio stream receiving segment 300 provides an audio stream 320 as output, which audio stream may be derived from any of a number of sources. In the context of the present invention, an audio stream may include any form of information representative of an audio signal received from any source. In a presently preferred embodiment, the audio stream is received by the mobile device via a wireless channel for later presentation to a user of the mobile device. However, in practice, the audio stream may come from virtually any source, including an audio source (e.g., a microphone or data port) resident within the mobile device. Additionally, the audio stream may be representative of real-time speech data, as in the case of a cellular telephone call, or may be representative of stored audio data, as in the case of playback of a recorded message. Regardless, the audio stream 320 is preferably in a form amenable to speech analysis by a speech analysis segment 302. If not in form amenable to speech analysis, as in the case of some compressed audio formats, conversion by either the audio stream receiving segment 300 or the speech analysis segment 302 may be necessary.

The speech analysis segment 302 implements speech recognition techniques as known in the art. In particular, the speech recognition performed by the speech analysis segment 302 preferably includes speaker-independent, application-specific speech recognition. That is, the speech analysis segment is specifically tailored to recognize the occurrence of telephone number-related speech patterns (or numeric utterances) occurring in audio streams provided by any speaking party. As used herein, telephone number-related speech patterns include parametric or other representations of human speech utterances that commonly occur when a telephone number is spoken or otherwise conveyed in an audible form. Such telephone number-related speech patterns may be stored in a suitable persistent memory.

For example, telephone numbers are typically spoken on a digit-by-digit basis. Thus, the phone number "555-123-4567" (using the 10 digit convention commonly used in North America) would likely be spoken as "five, five, five, one, two, three, four, five, six, seven" rather than "five billion, five hundred fifty one million, two hundred thirty four thousand, five hundred sixty seven" or "five hundred fifty five, one hundred twenty three, four thousand five hundred and sixty seven." However, there are often exceptions to this digit-by-digit rule of thumb. For example, the phone number "800-555-1000" might be spoken as "eight hundred, five, five, five, one thousand." As another example, the last four digits of a phone number comprising "3452" may be spoken as "three, four, five, two" or "thirty four, fifty two." Further still, alternative expressions of individual digits may be employed by certain speakers, e.g., substituting "oh" for "zero". In a presently preferred embodiment, a plurality of telephone number-related speech patterns of the type described above (e.g., "zero", "one", "two", "three", "four", "five", "six", "seven", "eight", "nine", "oh", "thirty four", "fifty two", "eight hundred", "one thousand", etc.) are provided and used as the basis for recognizing the occurrence of numbers within the audio stream. Because the speech recognition vocabulary is restricted in this manner, it is anticipated that reliable speech recognition on a speaker-independent basis may be performed.

In one embodiment of the present invention, the speech analysis segment 302 operates as a state machine having two states. In the first state, which may be termed a null state, the speech analysis segment 302 is "listening" for the occurrence of numeric utterances. The speech analysis segment 302 remains in this state until a numeric utterance is detected, at which point it switches to the second state, which may be referred to as an in-string state. Upon transition to the in-string state, it is assumed that the detected numeric utterance is the beginning of a string of numeric utterances. While operating during the in-string state, the speech analysis segment attempts to recognize the occurrence of further numeric utterances meeting various criteria to establish a string of related numeric utterances. Once various criteria are met, a string of detected number patterns corresponding to the string of numeric utterances is output, and processing returns to the null state. In various embodiments of the present invention, the determination whether a string of numeric utterances has terminated may be based on, for example, passage of a length of time between detections of a numeric utterances or a number of detected non-numeric utterances after detection of a numeric utterance. For example, if more than two seconds pass after the detection of a numeric utterance, it may be assumed that the numeric utterance has terminated. Alternatively, or in addition to this technique, a number of non-numeric utterances may be tracked for the same purpose. Thus, for example, if more than three non-numeric utterances occur after a numeric utterance, it again may be assumed that the numeric utterance has terminated. The number of non-numeric utterances may be tracked in a variety of ways dependent upon the nature of the speech recognition analysis. In general, this is accomplished by recognizing elemental structures of speech and counting the number of times such structures occur other than in numeric utterances. For example, syllables in non-numeric utterances may be determined, or even distinct phonemes within non-numeric utterances. In any event, note that the threshold values described here are exemplary only. Furthermore, those having ordinary skill in the art will appreciate that other criteria for determining the termination of a string of numeric utterances may be used, e.g., the occurrence of sufficiently long periods of silence after utterances. If a suitable criteria is met, the speech analysis segment 302 returns to the null state and the previous string of numeric utterances is assumed to have terminated. Otherwise, numeric utterances that are proximate in time (or proximate by number of intervening non-numeric utterances) are assumed to be related to each other forming a continuous string of numeric utterances.

Once telephone number-related speech patterns (or a string of numeric utterances) are detected, number patterns 322 corresponding to the telephone number-related speech patterns are identified and provided as output of the speech analysis segment 302. For example, as the speech patterns corresponding to "eight hundred", "oh", "one" and "five" are detected, the numbers "800", "0", "1" and "5" are provided as a string of detected number patterns. The strings of detected number patterns 322 (a string being defined as one or more number patterns) are preferably provided as input to a filtering segment 304 that applies a series of rules or patterns to the string of detected number patterns in an effort to minimize the likelihood of falsely recognizing such a string as a telephone number. Note that such filtering is not a requirement, but is advisable in order to minimize the occurrence of errors.

In a presently preferred embodiment, filtering is accomplished by subjecting the strings of detected number patterns to one or more filter rules, i.e., by inspecting various characteristics of the strings of detected number patterns to see whether the strings match desired or undesired characteristics. Such rules may be pre-configured and static, or they may be user configurable and dynamic. In one embodiment, the length (in terms of number of digits) of each string of detected number patterns is compared to standard lengths for telephone numbers. For example, in the United States and Canada, telephone numbers typically include 7 or 10 digits. In other countries, telephone numbers often have other conventional lengths. Additionally, some private exchanges may accept numbers that are, for example, 5 digits long, i.e., the phone number "576-1234" may be equally expressed as "6-1234" to parties accessing the local exchange internally. Thus, a given string of detected number patterns that does not match such conventional lengths is unlikely to be a telephone number and is thus ignored.

In another embodiment, the content of each string of detected number patterns is inspected and compared to benchmark patterns. For example, in the United States, the number "312" is a valid area code, whereas the number "311" is not. Thus, the 10 digit number pattern "312xxxxxxx" (where "xxxxxxx" is any valid 7 digit number) is possibly a valid telephone number, whereas the 10 digit number pattern "311xxxxxxx" is not a valid telephone number. Such rules based on area codes could account for all possible area codes, or could be restricted to only those area codes that a particular user is likely to encounter.

In yet another embodiment related to the above-described embodiments, the location or area of registration of the mobile device at the time of analyzing the audio stream (or when the speech was received) is taken into account. For example, if the mobile device is operating in the United States, one set of rules in accordance with the above-described embodiments may be used. However, if that same unit is now operating in a foreign country, a different set of rules in accordance with the above-described embodiments may be used.

The filtering segment 304 may also function to resolve ambiguities in strings of detected number patterns. For example, if the utterance "thirty five, forty two" is recognized by the speech analysis segment 302, the detected number patterns would likely be "35" and "42". However, given the manner in which humans sometimes express numbers, that utterance may be equally interpreted as "305402" or "3542". To address such scenarios, the filtering segment 304 may include rules that attempt to resolve such ambiguities in favor of finding a telephone number. For example, if the telephone number "800-555-3542" is represented by the utterances "eight hundred, five, five, five, thirty five, forty two", possible strings of detected number pattern strings would be "800555305402", "80055535402", "80055530542" or "8005553542". Of these four possible detected number pattern strings, only the last would be commensurate with a valid 10 digit phone number. The filtering segment 304 recognizes these possibilities and automatically resolves the ambiguities in favor of selecting the possible result or results that (most closely) match a valid telephone number.

A keyword utterance detection segment (not shown) may also be included in, or exist apart from and work in cooperation with, the speech analysis segment 302 or the filtering segment 304. Keywords in the context of the present invention are non-numeric utterances oftentimes associated with telephone numbers or other types of numbers. As in the case of the telephone number-related speech patterns, keyword utterances may be represented parametrically for use by a speech recognition algorithm. For example, the word "extension" is often used in describing a telephone number. The occurrence of the word "extension" proximate in time to a plurality of numeric utterances therefore serves as an indication to the speech analysis process that numeric utterances occurring before and after the word "extension" are related to the same string. Furthermore, the resulting number pattern string can include a symbol (e.g., a comma, dash or other insignia) representative of the point within the string of numeric utterances where the word "extension" occurred. Conversely, other types of keywords are often associated with numbers other than telephone numbers. For example, words like "street", "avenue", "drive", "boulevard" are more likely to be associated with residential addresses (e.g., "three one two main street") rather than telephone numbers. As such, numeric utterances proximate in time to such keywords are more unlikely to be a part of a telephone number. The same principle applies to state names. For example, consider an audio stream comprising "five two main street harvard illinois six oh oh three three." The occurrence of the words "street" and "illinois" between the digits "five two" and "six oh oh three three" indicate that this utterance corresponds to a residential address rather than a phone number of "526-0033."

Further "keywords" to be used in this manner may actually correspond to specific types of utterances that are typically encountered when a person is pausing while speaking, i.e., so-called pause fillers. For example, it is not uncommon for a person reciting a telephone number to interject sounds such as "uhh" or "umm" in between numbers. Utterances of this type do not provide any additional understanding whether a given string of numeric utterances has completed and thus comprise a category of utterances that are to be ignored by the speech analysis process when attempting to recognize strings of numeric utterances. For example, the termination criteria could be established such that such utterances do not contribute to the metric being used to determine when a string of numeric utterances has been completed.

As described above, the filtering segment 304 helps ensure that only valid telephone numbers are detected and captured. Still further processing is possible using the number pattern augmenting segment 306. Preferably operating upon the filtered number patterns 324 provided by the filtering segment 304, the augmentation segment 306 operates to complete partial phone numbers that may arise when, for example, a speaker omits an area code or only provides an extension number. Other augmentation scenarios may be possible. Like the filtering segment 304, the augmentation segment 306 preferably operates using a series of pre-configured or user-defined rules setting forth various patterns for comparison against the detected (and possibly filtered) number patterns. If a match to a given rule pattern occurs, an additional number pattern may be added to the number pattern under consideration in order to more fully complete the number pattern, resulting in an augmented number pattern 326. Alternatively, the user-defined rule may specify a transformation such that some portion of the number pattern is retained and another portion of the number pattern is discarded.

For example, in the case of area codes, the augmentation segment may compare 7 digit number patterns to determine whether certain area codes could be pre-pended. To this end, the augmentation segment 306 may include mappings (either pre-configured or user-defined) of certain prefixes occurring within strings of designated lengths (i.e., the first 3 digits of a 7 digit phone number) to likely area codes. For example, a rule may be established that 7-digit number patterns of the form "576xxxx" are suitable candidates for pre-pending the area code "847", whereas number patterns of different lengths but also beginning with "576" may be augmented in a different manner according to another rule. As an extension of this concept, it is known that certain telephone prefixes may be abbreviated in the case of private exchanges. For example, a large corporation may have one or more facilities in which all 7 digit phone numbers begin with either a "576" or "523" prefix (in both cases, assuming, for example, an "847" area code). In these instances, users may express their phone numbers using a 5 digit pattern, i.e., "6-1234" or "3-1000". The 5 digit number patterns (or other lengths as a matter of design choice) may be augmented by pre-pending the appropriate area code and prefix numbers, i.e., "6-1234" becomes "847-576-1234" and "3-1000" becomes "847-523-1000". Table 1 below provides a non-exhaustive list of various examples of mapping rules of the type described above.

TABLE 1

| Number Patterns | | Augmentation |
| --- | --- | --- |
| 6xxxxx | → | 847 576 xxxx |
| 3xxxx | → | 847 523 xxxx |
| 4xxxx | → | 815 884 xxxx |
| 653xxxx | → | 919 653 xxxx |

TABLE 1-continued

| Number Patterns | | Augmentation |
|---|---|---|
| 482xxxx | → | 919 482 xxxx |
| 2xx | → | 919 653 12xx |

It may be the case that, in some instances, more than one area code or other additional number pattern could be appended to a detected number pattern. A solution to this problem is to disallow conflicting rules that map given number patterns to different augmentation results. Preferably, where more than one augmentation possibility exists, both results are provided and later presented to the user as options to choose from. This same technique could also be used in the case where a number pattern has multiple possible interpretations (i.e., resolving ambiguities in detected number patterns) which match multiple rules.

The augmentation segment 306 may also take into account the location of operation or area of registration of the mobile unit when applying the augmentation rules. For example, when in the United States, the augmentation rules may include appending a "1" as the first digit of the augmented number pattern for area codes outside the area code where the mobile device is located or registered. Conversely, when operating outside the United States, different access codes may be appended as in accordance with local conventions.

The detected (and possibly filtered and augmented) number patterns are stored via a detected number pattern storage segment 308. In a preferred embodiment, the detected number pattern storage segment 308 maintains a list of the most recently detected N number patterns in a suitable storage device, where N is user configurable and limited only by the amount of available memory. Additionally, the storage segment 308 may operate to store portions of the audio stream 330 in a suitable storage device. As shown, an audio stream capture segment 312 is provided that routes the audio stream 330 to a circular buffer, implemented by the storage segment 308, that continuously stores the last M seconds of the audio stream 330. Upon hearing the occurrence of a telephone number (via the audio stream playback not shown), the user of the mobile device provides an instruction to the audio stream capture segment 312. In response, the audio stream capture segment 312 instructs (not shown) the storage segment 308 to freeze the circular buffer in its current state. By designing the length of the circular buffer to account for average lengths of time it would take a user to hear a number and input the necessary instruction, it is possible to ensure that the portion of the audio stream containing the telephone number will be present in the buffer. If desired, the contents of the now-frozen buffer may be stored in persistent memory elsewhere such that the circular buffer may continue being updated. The number of audio portions that may be captured in this manner, as well as the individual durations and cumulative durations of such captured portions, is necessarily limited by the available amount of suitable storage space. Furthermore, the manner in which these types of instructions are input by a user is limited only by the availability of suitable input devices (e.g., other input/output devices 212).

In one embodiment of the present invention, the portion of the audio stream 330 stored in this manner can be provided to the speech analysis segment 302 by the storage segment 308 (indicated by the dashed line) for analysis as described above. In this case, the audio stream 320 does not have to be continuously provided to the analysis segment 302. Rather, only those portions of the audio stream that are deemed relevant by the user are provided to the speech analysis segment 302 when necessary.

When at least one number pattern (and, optionally, at least one corresponding portion of an audio stream) is stored, a detected number presentation segment 310 may be employed. In one embodiment, the presentation segment 310 accesses the list of detected numbers maintained by the storage segment 308 and renders the detected numbers visible via a suitable display device (e.g., display 204). The presentation segment 310 preferably displays the list in response to an instruction received from the user, although the list could be displayed automatically at convenient times, e.g., at the conclusion of a currently ongoing call. In a similar vein, an audio stream presentation segment 316 causes stored portions of audio streams 330 to be rendered audible. In one embodiment, individual detected number patterns being displayed may have an indicator (such as an icon, graphical symbol, etc.) displayed therewith, the indicator being representative of a stored portion of an audio stream corresponding to that detected number pattern. By selecting the indicator (e.g., by pressing a button, soft key, region of a touch screen, etc. associated with the indicia), the portion of the audio stream 330 associated with the detected number pattern is rendered audible by the audio stream presentation segment 316 such that the user can quickly verify the accuracy of the detected number pattern. Furthermore, the portion of the audio stream 330 may be played back in a continuously looping fashion such that the user can hear the portion multiple times when verifying the accuracy of the detected number pattern.

If a user determines that there are errors in a detected number pattern based on the display, an editing segment 314 may be employed to input edits 340 to the displayed number patterns. The editing segment 314 allows a user to select a particular displayed number pattern (e.g., by highlighting a particular displayed number pattern) and edit the number pattern, which edits 340 are provided to the storage segment 308 to update the corresponding stored number pattern. Techniques for accepting edits to displayed numbers in mobile devices are well known in the art. Additionally, the editing segment 314 may provide the option for the user to transfer a displayed number pattern (edited or otherwise) to persistent storage. Again, any conventional input mechanism may be employed (e.g., a button, pull-down menu, soft key, etc.) to allow the user to indicate a desire to transfer a number pattern to persistent memory.

Figure 4:
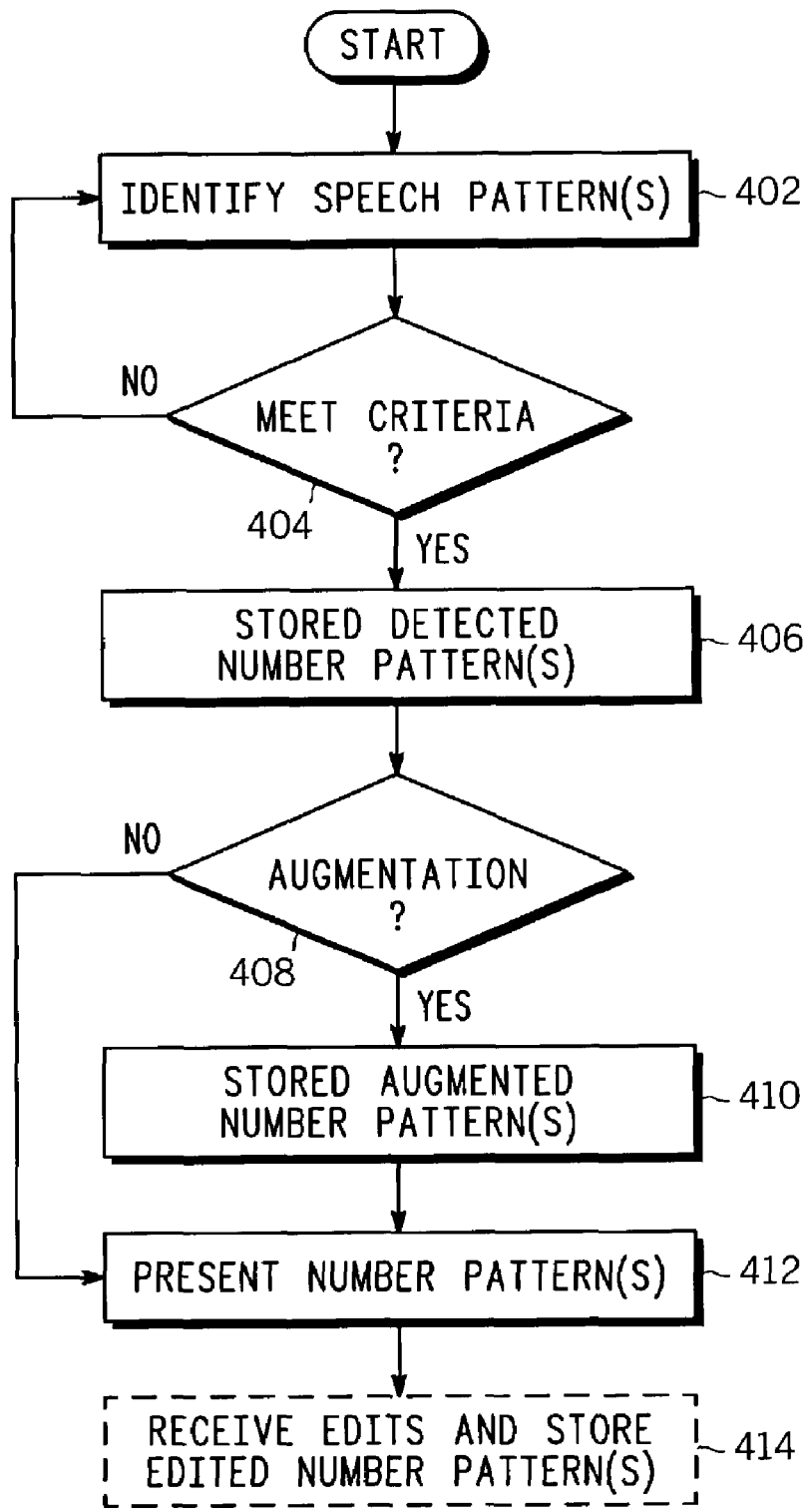
FIG. 4 is a flow chart illustrating a method in accordance with a preferred embodiment of the present invention.

Referring now to FIG. 4, a flow chart in accordance with a preferred embodiment of the present invention is provided. The process illustrated by the flow chart of FIG. 4 may be implemented by the code segments described above as implemented within a mobile device. At block 402, an audio stream is scanned (via speech analysis) for the occurrence of telephone number-related speech patterns. If the occurrences meet filtering criteria, at block 404, number patterns corresponding to the occurrences are stored at block 406. If possible, the detected number patterns are augmented at block 408 and thereafter stored at block 410. Regardless of whether the detected number patterns have been augmented, the stored number patterns are presented to a user of the mobile device at block 412 either automatically or in response to an instruction received from the user. Thereafter, at block 414, the user may optionally edit any of the displayed number patterns and cause selected ones of the displayed number patterns to be persistently stored in memory or called, as in the case of the user selecting the "send" button commonly found in current cellular telephones.

The present invention provides a technique for processing telephone numbers that occur in audio streams. By performing speech recognition analysis on audio streams, occurrences of telephone number-related speech patterns are identified and corresponding detected number patterns are identified. Filtering and augmentation techniques may be applied to the detected number patterns to minimize errors and ensure completeness. Editing operations and capture/playback of corresponding portions of the audio stream are provided to ensure accuracy. In this manner, telephone numbers may be conveniently, and safely, captured for later use by users of mobile devices.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. In a communication device, a method for processing a telephone number, the method comprising:
   identifying occurrences of at least one of a plurality of telephone number-related speech patterns in a wirelessly received audio stream, during a call; and
   storing at least one detected number pattern corresponding to the occurrences of the at least one of the plurality of telephone number-related speech patterns; and
   presenting the at least one detected number pattern to a user of the communication device.

2. The method of claim 1, further comprising:
   providing an augmented number pattern by appending at least one additional number pattern to the at least one detected number pattern; and
   presenting the augmented number pattern to the user.

3. The method of claim 2, further comprising:
   determining the at least one additional number pattern based on at least one of: a portion of the detected number pattern, a length of the detected number pattern, a location of operation of the communication device and an area of registration of the communication device.

4. The method of claim 1, further comprising:
   disregarding occurrences of pause-filler utterances within the audio stream between any two of the occurrences.

5. The method of claim 1, further comprising:
   identifying occurrence of a keyword utterance within the audio stream proximate in time to the occurrences of the at least one of the plurality of telephone number-related speech patterns; and
   storing the at least one detected number pattern corresponding to the occurrences of the at least one of the plurality of telephone number-related speech patterns when the occurrences of the at least one of the plurality of telephone number-related speech patterns are proximate in time to the occurrence of the keyword utterance.

6. The method of claim 1, further comprising:
   rendering the audio stream audible to the user;
   providing a stored portion of the audio stream in response to receiving an instruction from the user; and
   identifying occurrences of at least one of a plurality of telephone number-related speech patterns in the stored portion of the audio stream.

7. The method of claim 6, further comprising:
   presenting the stored portion of the audio stream substantially simultaneously with the detected number pattern.

8. The method of claim 1, further comprising:
   persistently storing the detected number pattern in response to receiving an instruction from the user.

9. The method of claim 1, further comprising:
   providing an edited number pattern in response to edits to the at least one detected number pattern received from the user; and
   persistently storing the edited number pattern in response to the instruction.

10. A wireless communication device comprising:
    a processor;
    a display coupled to the processor;
    a wireless receiver coupled to the processor, the wireless receiver for receiving an audio stream during a call;
    a storage device coupled to the processor; and
    processor executable instructions stored in the storage device,
    the processor executable instructions including a speech analysis segment that identifies occurrences of at least one of a plurality of telephone number-related speech patterns in the audio stream, during the call,
    the processor executable instructions including a detected number pattern storage segment that stores at least one detected number pattern corresponding to the occurrences of the at least one of the plurality of telephone number-related speech patterns,
    the processor executable instructions including a detected number pattern presentation segment presenting the at least one detected number pattern via the display.

11. The wireless communication device of claim 10,
    the processor executable instructions including a number pattern augmenting segment that appends at least one additional number pattern to the at least one detected number pattern,
    whereby the detected number pattern presentation segment present an augmented number pattern provided by the number pattern augmenting segment.

12. The wireless communication device of claim 10,
    the processor executable instructions including a keyword utterance detection segment that identifies occurrences of a keyword utterance,
    whereby the detected number pattern storage segment stores the at least one detected number pattern corresponding to the occurrences of the at least one of the plurality of telephone number-related speech patterns when the occurrences of the at least one of the plurality of telephone number-related speech patterns are proximate in time to the occurrence of the keyword utterance.

13. The wireless communication device of claim 10, further comprising:
a user-actuated instruction input device coupled to the processor,
the processor executable instructions including an audio stream capture segment responsive to an instruction from the user-actuated instruction input device,
whereby the speech analysis segment operates upon a stored audio stream portion provided by the audio stream capture segment.

14. The wireless communication device of claim 13, further comprising:
a speaker, coupled to the processor,
the processor executable instructions including a stored audio stream portion presentation segment,
the detected number presentation segment presenting the at least one detected number pattern via the display substantially simultaneously with the stored audio stream presentation segment presenting the stored audio stream portion via the speaker.

15. A wireless communication device comprising:
an audio stream receiving wireless receiver;
a telephone number-related speech pattern recognizing speech analyzer coupled to the audio stream receiving wireless receiver and operating upon an audio stream provided by the audio stream receiving wireless receiver;
a detected number pattern filtering component coupled to the telephone number-related speech pattern recognizing speech analyzer operating upon at least one detected number pattern provided by the telephone number-related speech pattern recognizing speech analyzer; and
a filtered number pattern augmenting component coupled to the detected number pattern filtering component.

16. The wireless communication device of claim 15, the detected number pattern filtering component further comprising at least one pattern rule.

17. A method in a communication device, the method comprising:
detecting communication of a plurality of at least two numbers in an audio stream in the communication device during a voice call; and
storing the plurality of at least two numbers detected in the communication device during the voice call.

18. The method of claim 17 including presenting the plurality of numbers at a user interface of the communication device.

19. The method of claim 17 including:
appending at least one additional number to the plurality of numbers detected, and
presenting the appended number with the plurality of numbers at the user interface of the communications device.

20. The method of claim 17, further comprising:
detecting communication of non-number information between the plurality of numbers during the voice call, and
not storing the non-number information communicated between the plurality of numbers.

21. In a communication device, a method for processing a telephone number, the method comprising:
identifying occurrences of at least one of a plurality of telephone number-related speech patterns in a received audio stream;
storing at least one detected number pattern corresponding to the occurrences of the at least one of the plurality of telephone number-related speech patterns;
providing an augmented number pattern by appending at least one additional number pattern to the at least one detected number pattern;
presenting the augmented number pattern to the user; and
determining the at least one additional number pattern based on at least one of: a portion of the detected number pattern, a length of the detected number pattern, a location of operation of the communication device and an area of registration of the communication device.

* * * * *